(12) United States Patent
Panabaker et al.

(10) Patent No.: US 7,840,754 B2
(45) Date of Patent: Nov. 23, 2010

(54) EFFICIENTLY SYNCHRONIZING WITH SEPARATED DISK CACHES

(75) Inventors: Ruston Panabaker, Bellevue, WA (US); Cenk Ergan, Bellevue, WA (US); Michael R. Fortin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 26 days.

(21) Appl. No.: 12/473,327

(22) Filed: May 28, 2009

(65) Prior Publication Data

US 2009/0235021 A1   Sep. 17, 2009

Related U.S. Application Data

(63) Continuation of application No. 11/471,210, filed on Jun. 20, 2006, now Pat. No. 7,558,913.

(51) Int. Cl.
G06F 12/06 (2006.01)
(52) U.S. Cl. ............... 711/113; 711/135; 711/141; 711/203
(58) Field of Classification Search ......... 711/113, 711/135, 141, 203
See application file for complete search history.

(56) References Cited

U.S. PATENT DOCUMENTS

| | | | |
|---|---|---|---|
| 5,732,238 A | 3/1998 | Sarkozy | |
| 5,734,861 A | 3/1998 | Cohn | |
| 5,819,292 A | 10/1998 | Hitz | |
| 6,128,627 A | 10/2000 | Mattis | |
| 6,317,844 B1 | 11/2001 | Kleiman | |
| 6,513,097 B1 | 1/2003 | Beardsley | |
| 6,732,293 B1* | 5/2004 | Schneider | 714/15 |
| 6,760,815 B1 | 7/2004 | Traversat | |
| 6,775,794 B1* | 8/2004 | Horst et al. | 714/42 |
| 6,799,188 B2 | 9/2004 | Weedon | |
| 6,941,423 B2 | 9/2005 | Coulson | |
| 6,978,279 B1* | 12/2005 | Lomet et al. | 1/1 |

(Continued)

FOREIGN PATENT DOCUMENTS

WO   WO0201365 A2   1/2002

OTHER PUBLICATIONS

International Search Report dated Nov. 14, 2007 for Application No. PCT/US2007/012973, 10 pages.
Bisson, Timothy, et al, "Reducing Energy Consumption using a Non-Volatile storage cache", http://www.cse.ucsc.edu/~sbrandt/papers/IWSSPS05.pdf.
Chao, Chia, et al., "Mime: a high performance parallel storage device with strong recovery guarantees", http://www.stepanovpapers.com/HPL-CSP-92-9rev1.pdf.
Obr, Nathan, "Non Volatile Cache Command Proposal for ATA8-ACS", http://www.t13.org/docs2005/e05106r1-ACS-NV_Cache_Command_Proposal.pdf.
Ruemmler, Chris, et al., "UNIX disk access patterns", http://www.hpl.hp.com/personal/John_Wilkes/papers/USENIX.Jan93.pdf.

Primary Examiner—Jack A Lane

(57) ABSTRACT

In a method of synchronizing with a separated disk cache, the separated cache is configured to transfer cache data to a staging area of a storage device. An atomic commit operation is utilized to instruct the storage device to atomically commit the cache data to a mapping scheme of the storage device.

17 Claims, 6 Drawing Sheets

U.S. PATENT DOCUMENTS

| | | |
|---|---|---|
| 6,996,668 B2 | 2/2006 | Gaetner |
| 7,000,083 B2 | 2/2006 | Jarvis |
| 7,363,540 B2* | 4/2008 | Patel et al. .................... 714/19 |
| 2002/0116457 A1 | 8/2002 | Eshleman |
| 2003/0084252 A1* | 5/2003 | Talagala ..................... 711/135 |
| 2003/0120873 A1 | 6/2003 | Kanaley |
| 2003/0204670 A1* | 10/2003 | Holt et al. ................... 711/112 |
| 2004/0250172 A1* | 12/2004 | Patel et al. ..................... 714/42 |
| 2005/0144396 A1* | 6/2005 | Eschmann et al. .......... 711/143 |
| 2005/0246487 A1* | 11/2005 | Ergan et al. ................. 711/113 |
| 2005/0246488 A1 | 11/2005 | Kiba |
| 2006/0020752 A1 | 1/2006 | Schnapp |
| 2006/0041602 A1* | 2/2006 | Lomet et al. ................ 707/201 |
| 2006/0143407 A1* | 6/2006 | Humlicek ................... 711/143 |
| 2006/0248387 A1* | 11/2006 | Nicholson et al. ............. 714/22 |
| 2006/0294300 A1* | 12/2006 | Lubbers ...................... 711/113 |
| 2007/0118691 A1* | 5/2007 | Therene et al. ............. 711/114 |
| 2008/0120470 A1* | 5/2008 | Dhamankar et al. ......... 711/135 |
| 2009/0049238 A1* | 2/2009 | Zhang et al. ................ 711/113 |

* cited by examiner

300

> CONFIGURING A SEPARATED CACHE TO TRANSFER CACHE DATA TO A STAGING AREA OF A STORAGE DEVICE.
> 310

> UTILIZING AN ATOMIC COMMIT OPERATION TO INSTRUCT THE STORAGE DEVICE TO ATOMICALLY COMMIT THE CACHE DATA TO A MAPPING SCHEME OF THE STORAGE DEVICE.
> 320

> RECEIVING A RESPONSE TO THE ATOMIC COMMIT OPERATION FROM THE STORAGE DEVICE.
> 330

> CONDITIONING ERASURE OF THE CACHE DATA FROM THE SEPARATED CACHE ON RECEIPT OF A POSITIVE RESPONSE TO THE ATOMIC COMMIT OPERATION.
> 340

```
ENSURING CONFIGURATION OF A STAGING AREA WITHIN
A STORAGE DEVICE, THE STAGING AREA FOR RECEIVING
CACHE DATA TRANSFERRED FROM A SEPARATED CACHE
TO THE STORAGE DEVICE.
610
           │
           ▼
DIRECTING TRANSFER OF THE CACHE DATA FROM THE
SEPARATED CACHE TO THE STAGING AREA.
620
           │
           ▼
INITIATING AN ATOMIC COMMIT OPERATION TO
INCORPORATE THE CACHE DATA INTO A MAPPING
SCHEME OF THE STORAGE DEVICE.
630
           │
           ▼
CONDITIONING ERASURE OF THE CACHE DATA FROM THE
SEPARATED CACHE ON A SUCCESSFUL OUTCOME OF THE
ATOMIC COMMIT OPERATION.
640
```

FIG. 6

EFFICIENTLY SYNCHRONIZING WITH SEPARATED DISK CACHES

CROSS-REFERENCE TO RELATED APPLICATIONS

This application claims priority to and is a continuation of co-pending U.S. patent application Ser. No. 11/471,210 entitled "Atomic Commit of Cache Transfer with Staging Area" and filed Jun. 20, 2006, which is incorporated herein by reference.

BACKGROUND

In today's computing environment, separated caches are commonly used in conjunction with storage devices such as hard disk drives. This is because use of a separated cache has many benefits. For instance, one benefit is increased performance of a computer system or storage device that the cache is used in conjunction with. Another benefit is decreased power consumption (which corresponds to increased battery life in a portable computer). Power consumption is decreased, because it takes less power to operate and access data from a cache than to operate and access the spinning media of a storage device, such as a hard disk drive, for every data access operation. However, the advantages that are realized through the use of a separated cache also come with some problems.

A major problem with using a separated cache is cache consistency. That is, ensuring that the data in the cache is kept consistent with the data on the storage device. When dealing cache consistency issues, at least two things are at stake. The first thing at stake is the cache data, which could be lost or corrupted. If the cache data is lost or corrupted, then the computing data that has been stored or revised for a time period, such as the last few minutes, may be lost. This would pose some annoyances, but would likely involve only a few percent of the total data of the storage device. The second thing at stake is the remaining data on the storage device. If this data is corrupted by improperly maintaining consistency with the cache, or by improperly synchronizing with the cache, the entire contents of the storage device may be lost.

The problem of cache consistency between a separated cache and a storage device is generally dealt with in one of two ways. The first way involves saving all data changes in the cache and then flushing cache data from the cache to the storage device through a process of ordered writes. In the ordered writes method, the cache data that is written to the cache is written back to the storage device in the exact order that it was written to the cache. The second way involves saving only the most recent changes to data within the cache and then flushing the cache data from the cache to the storage device by writing the cache data to each location that it is associated with (ordered writes need not be used).

One problem with the first-in-first-out ordered writes method is that it is far less efficient than possible. For example, the ordered writes method requires storing much more data in the separated cache than just the most recently changed data. This results in having a larger cache than may be needed or else inefficiently using the available space in the cache. Additionally, while the ordered writes method of writing cache data back to a storage device is a reliable way of ensuring consistency, it is a very slow way to flush cache data from a cache. For example, the ordered writes method typically causes seeks at random on a hard disk drive throughout the ordered write back process, even though many times the same location is sought out and written to several separate times. The cumulated time of these seeks is a main contributor to the slow speed of cache data flushing when using the ordered writes method.

Some of the problems of the ordered write method are resolved by using a method of caching which saves only the most recent version of data in the separated cache. As compared to the ordered writes method, this allows for either a smaller cache size or else more efficient use of the of the storage space available in the cache. Similarly, the speed of writing the cache data to the storage device during a cache flushing operation is increased as seeks for a particular location of the storage device are typically performed only one time. However, this method still suffers several problems. For example, as in the ordered writes method, random seeks are typically conducted on a hard drive as the cache data is written to various location on a hard disk drive storage device. This slows down the cache data flushing process. Additionally, if an interruption, such as a power failure, occurs during the synchronizing process, all data on the storage device may be corrupted due to a lack of consistency of the data, which is in various stages of update throughout the storage device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technology for efficiently synchronizing with a separated disk cache is disclosed. One method of the technology involves configuring the separated cache to transfer cache data to a staging area of the storage device. The cache data is transferred, for example, as part of a flush operation. An atomic commit operation is then utilized to instruct the storage device to atomically commit the cache data to a mapping scheme of the storage device. Such an atomic commit operation is an all or nothing operation, which is either successful or unsuccessful. In response to receiving a positive response (indicating success) from a storage device following an atomic commit operation, the cached data can safely be erased from the separated cache.

The staging area provides a region of the storage device for writing the cache data to. The staging area may be located, for example, outside of existing logical block addresses of the storage device prior to the atomic commit operation. The atomic commit operation incorporates the cache data from the staging area into a mapping scheme, such as the logical block addresses, of the storage device. Additionally, part of the cache data transfer process may involve transferring one or more mappings of the cache data to the storage device, such as for use in identifying a suitable staging area or for use in correctly identifying cache data to be committed to the storage device.

DESCRIPTION OF THE DRAWINGS

The accompanying drawings, which are incorporated in and form a part of this specification, illustrate embodiments of the technology for efficiently synchronizing with a separated disk cache and, together with the description, serve to explain principles discussed below:

FIG. 3 is a flow diagram of operations performed in accordance with one method embodiment of the present technology for efficiently synchronizing with a separated disk cache.

FIG. 6 is a flow diagram of operations performed in accordance with another method embodiment of the present technology for efficiently synchronizing with a separated disk cache.

DETAILED DESCRIPTION

Reference will now be made in detail to embodiments of the present technology for efficiently synchronizing with a separated disk cache, examples of which are illustrated in the accompanying drawings. While the technology for efficiently synchronizing with a separated disk cache will be described in conjunction with various embodiments, it will be understood that they are not intended to limit the present technology for efficiently synchronizing with a separated disk cache to these embodiments. On the contrary, the presented technology for efficiently synchronizing with a separated disk cache is intended to cover alternatives, modifications and equivalents, which may be included within the spirit and scope the various embodiments as defined by the appended claims. Furthermore, in the following detailed description, numerous specific details are set forth in order to provide a thorough understanding of the present technology for efficiently synchronizing with a separated disk cache. However, the present technology for efficiently synchronizing with a separated disk cache may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "configuring", "utilizing", "receiving", "conditioning", "providing", "configuring", "ensuring", "directing", "initiating", "transferring", "generating", "committing", and "erasing", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for efficiently synchronizing with a separated disk cache is also well suited to the use of other computer systems such as, for example, optical, virtual, and mechanical computers. Additionally, it should be understood that in embodiments of the present technology for efficiently synchronizing with a separated disk cache, one or more of the steps can be performed manually.

Example Computer System Environment

Figure 1:
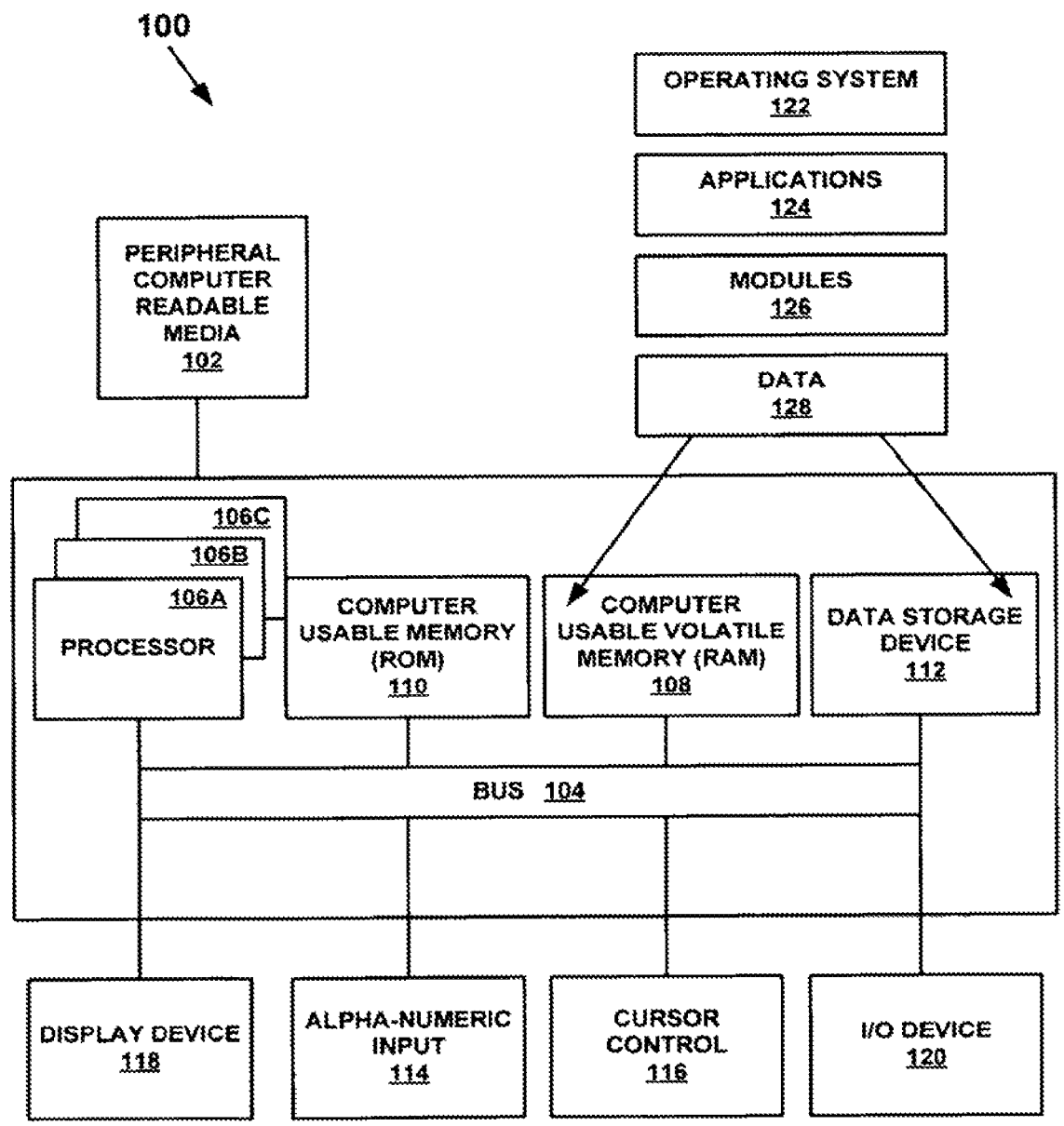
FIG. 1 is a diagram of an exemplary computer system used in accordance with embodiments of the present technology for efficiently synchronizing with a separated disk cache.

With reference now to FIG. 1, portions of the technology for efficiently synchronizing with a separated disk cache are composed of computer-readable and computer-executable instructions that reside, for example, in computer-usable media of a computer system. That is, FIG. 1 illustrates one example of a type of computer that can be used to implement embodiments, which are discussed below, of the present technology for efficiently synchronizing with a separated disk cache. FIG. 1 illustrates an exemplary computer system 100 used in accordance with embodiments of the present technology for efficiently synchronizing with a separated disk cache. It is appreciated that system 100 of FIG. 1 is exemplary only and that the present technology for efficiently synchronizing with a separated disk cache can operate on or within a number of different computer systems including general purpose networked computer systems, embedded computer systems, routers, switches, server devices, client devices, various intermediate devices/nodes, stand alone computer systems, virtualized computer systems and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage device 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1, may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage device 112. In one embodiment, the present technology for efficiently synchronizing with a separated disk cache, for example, is stored as an application 124 or module 126 in memory locations within RAM 108, memory areas within data storage device 112, or memory locations associated with a separated cache of storage device 112.

Exemplary System for Efficiently Synchronizing with a Separated Disk Cache

Figure 2:
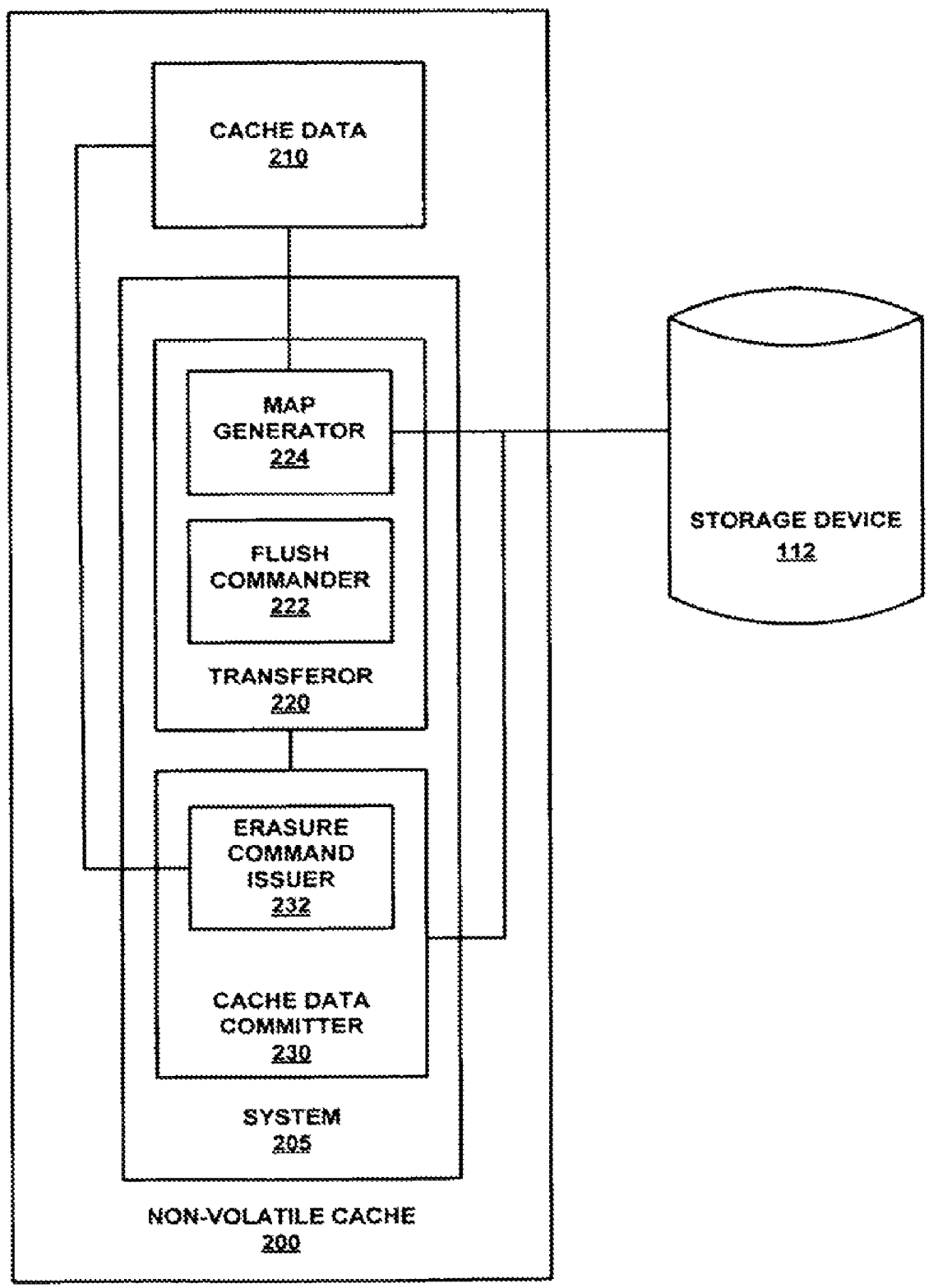
FIG. 2 is a diagram of one embodiment of a system for efficiently synchronizing with a separated disk cache.

FIG. 2 shows a block diagram of components of an exemplary system 205 which maintains a storage device state with a separated cache, according to one embodiment of the present technology. The following discussion will begin with a description of the physical structure of system 205. Discussion will turn to description of components of system 205 used in an exemplary method for maintaining a storage device state with a separated cache. Visual representations of the process will be described. Discussion will then proceed to a description of components of system 205 used in an exemplary method for synchronizing a storage device with a separated cache.

Physical Structure

With respect to the physical structure, system 205 is comprised of a transferor 220, and a cache data committer 230. Transferor 220 and cache data committer 230 coupled to one another, and are both coupled to cache data 210 of a separated cache, such as separated cache 200, and additionally to storage device 112. These couplings allow the interchange of information such as mappings, commands, instructions, signals, and responses.

For example, in one embodiment, transferor 220 is configured to receive cache data 210 from separated cache 200 and then transfer cache data 210 to a staging area of logical blocks located in storage device 112. In one such embodiment, the transferred cache data 210 is written sequentially or substantially sequentially into the staging area by storage device 112 as it is received from transferor 220.

Similarly, in one embodiment cache data committer 230 is configured to communicate with storage device 112 to initiate an atomic commit operation which, as described more fully below, will be performed within storage device 112 on cache data 210 which has been transferred to a staging area of storage device 112. Such communication between cache data committer 230 and storage device 112 ensures the successful commitment of transferred cache data 210 to storage device 112. In one such embodiment, cache data committer 230 is configured to receive a response communication (such as a positive or negative response) from storage device 112 which indicate the success (positive response) or failure (negative response) of such an atomic commit operation performed by storage device 112.

As shown in FIG. 2, cache transferor 220 is further comprised of a map generator 224 and a flush commander 222. Map generator 224 is coupled to cache data 210 and is configured to utilize information, such as metadata of cache data 210, to generate mappings which describe cache data 210. In one embodiment such mappings are then provided from map generator 224, via transferor 220, to storage device 112 for use in determining the number of logical blocks required to create a staging area of appropriate size.

Flush commander 222 is utilized in various embodiments to receive a cache flushing command and, in response, initiate a flushing operation to flush cache data 210 to storage device 112. In various embodiments, flush commander 222 is also used to self-initiate the flushing of cache data 210 without the receipt of a cache flushing command. Once initiated by flush commander 222 (either through self-initiation or in response to a flush command), the flushing operation causes cache data 210 from separated cache 200 to be flushed (transferred) to storage device 112. Flushing cache data 210 from separated cache 200 to storage device 112 helps maintain the data of storage device 112 in a consistent state with changes that occur to copies of data stored in separated cache 200. Such a flush operation may be self-initiated by flush commander 222 or initiated by flush commander 222 in response to a flush command received from separated cache 200, system 205, storage device 112, computer system 100 (FIG. 1), or some other outside source.

For example, in one embodiment separated cache 200 initiates a flush command at regular periodic intervals or in response to storage of a predetermined amount of cache data. In response to receipt of this flush command, flush commander 222 initiates a cache flushing operation. Such cache flushing facilitates maintaining storage device 112 in a synchronized and consistent state with changes in data stored in cache data 210. Similarly, in another embodiment, flush commander 222 self-initiates a flush operation at a predetermined time interval or in response to storage of predetermined amount of cache data 210 (such as a number of megabytes of data or a percentage of available cache data storage space being utilized). Thus, in one embodiment of the present technology, transferor 220 begins the transfer of cache data 210 to storage device 112 following the receipt of a flush command or self-initiation of a flushing operation by flush commander 222.

As shown in FIG. 2, in one embodiment of the present technology, cache data committer 230 also comprises erasure command issuer 232. In one embodiment, functionality of erasure command issuer 232 may be incorporated within cache data committer 230 rather than being performed by a separate entity as illustrated in FIG. 2. Erasure command issuer 232 is configured to communicate information from cache data committer 230 to separated cache 200. The communicated data initiates, approves, or carries out the erasure of cache data 210. For example, in one embodiment, after cache data committer 230 receives confirmation of a positive result to an atomic commit operation from storage device 112, erasure command issuer 232 issues an erasure command to separated cache 200. The erasure command causes separated cache 200 to erase the contents of cache data 210 which have been successfully transferred to and committed to storage device 112.

Storage device 112, as shown in FIG. 2 and elsewhere, may comprise any of a variety of known storage devices which include, but are not limited to, storage devices such as a hard disk drive and an optical drive. However, for purpose of example, and not of limitation, storage device 112 may be presumed to be a hard disk drive in the various examples illustrated herein. Thus, as shown in the embodiment of FIG. 2, storage device 112 may be presumed to be a hard disk drive which is coupled to separated cache 200.

Separated cache 200 may be any of a variety of known separated caches, and may be comprised of non-volatile, volatile, or a combination of volatile and non-volatile cache storage elements. Separated cache 200 may store cache data 210 in any of a variety of known methods, for example, ordered writes data storage, most recent version data storage, and etc. However, for purposes of example and not of limitation, it should be presumed that separated cache 200 is configured to store as cache data 210 the most recent version of data that has been accessed and/or modified by computer system 100 (FIG. 1) or a similar electronic device, rather than storing data all modifications such as would be the case in a separated cache configured for synchronizing data states with storage device 112 by performing an ordered writes operation.

Additionally, as shown in FIG. 2, system 205 is incorporated within separated cache 200. It is appreciated that in other embodiments some or all of the components of system 205 may be located apart from separated cache 200 and simply coupled to separated cache 200. It is also appreciated that in some embodiments of the present technology, one or more of the components or their functions, as shown in FIG. 2, may not be included or utilized in a system for efficiently synchronizing with a separated disk cache. It is further appreciated that additional un-illustrated components or functions may be also included in such a system. Moreover, it is also appreciated that in some embodiments of the present technology, functions or operations of one or more components shown in FIG. 2 may be combined into a single component or separated into multiple components. However, for simplicity of illustration and ease of explanation, operations of a system for efficiently synchronizing with a separated disk cache will be described in accordance with the exemplary displayed embodiment of system 205.

Exemplary Methods of Operation

The following discussion sets forth in detail the operation of present technology for efficiently synchronizing with a separated disk cache. With reference to FIGS. 3 and 6, flow diagrams 300 and 600 each illustrate exemplary steps used by various embodiments of the present technology for efficiently synchronizing with a separated disk cache. Flow diagrams 300 and 600 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, data storage device 112 of FIG. 1, and/or a cache associated with a data storage device such as data storage device 112. The computer-readable and computer-executable instructions are used to control or operate in conjunction with, for example, processor 106A and/or processors 106A, 106B, and 106C of FIG. 1, a processor associated with data storage device 112, and/or a processor associated with a cache such as separated cache 200 of FIG. 2. Although specific steps are disclosed in flow diagrams 300 and 600, such steps are exemplary. That is, embodiments are well suited to performing various other steps or variations of the steps recited in flow diagrams 300 and 600. It is appreciated that the steps in flow diagrams 300 and 600 may be performed in an order different than presented, and that not all of the steps in flow diagrams 300 and 600 may be performed.

Maintaining a Storage Device State with a Separated Cache

FIG. 3 is a flow diagram 300 of operations performed in accordance with one embodiment of the present technology for efficiently synchronizing with a separated disk cache. More specifically, FIG. 3 illustrates a flow diagram 300 of an exemplary embodiment of a method for maintaining a storage device state with a separated cache. Elements of system 200 and flow diagram 300 are explained below, in conjunction with reference to elements of FIG. 4 and FIG. 5.

At 310 of flow diagram 300, in one embodiment of the present technology, a separated cache is configured to transfer cache data to a staging area of a storage device. The cache data is transferred to the staging area of the storage device for a variety of reasons such as, for example: in response to a flush command; in response to a flush operation; at a pre-determined interval; because the separated cache is full; or in response to some other factor. For example, in one such embodiment as shown in FIG. 2, separated cache 200 is configured with a transferor 220 which is used to transfer cache data 210 to a staging area of logical blocks in storage device 112. Transferor 220 can transfer cache data 210 automatically, such as at predetermined intervals. Transferor 220 can also transfer cache data 210 to storage device 112 in response to a receipt of a flush command by or self-initiation of a flush operation by flush commander 222.

In one such embodiment, consistent with 310 of flow diagram 300, cache data 210 is provided by transferor 220 for sequential or substantially sequential writing into the staging area of storage device 112. Providing cache data 210 for sequential writing means that cache data 210 can be presented in any particular order and will be written sequentially or substantially sequentially into the staging area of storage device 112 as it is received from transferor 220. This allows for faster data transfer than prior methods, and it substantially eliminates the often random seeks which tend to slow down many other methods of transferring cache data from a separated cache to a storage device.

In one embodiment of the present technology, the staging area of storage device 112 comprises a sequentially writable area of logical blocks. In one embodiment, this staging area is created by the storage device. In one instance, the staging area is created as a scratch pad of sequentially writable logical blocks which are set aside within the logical block addressing (LBA) mapped by storage device 112. In another instance, the staging area comprises a set of logical bocks located outside of the LBA mapping area of storage device 112, for example in a hidden region of storage device 112 that is dedicated to receiving cache data 210. Creating the staging area in a region that does not exist in the logical block addressing of storage device 112 allows for writing a large amount, and in some embodiments all, of cache data 210 sequentially into one, or in some cases several, contiguous sequentially writable areas. This sequential writing into a contiguous staging area(s) advantageously eliminates nearly all of the random seeking that occurs during many other slower methods of transferring flushed cache data from a separated cache to a storage device. Elimination of the majority of random seeking substantially shortens the amount of time required to transfer cache data 210 from cache 200 to storage device 112 in response to a data flushing command. For example, using this method, transferring 100 Megabytes of data from cache 200 to storage device 112 during a cache flushing operation may take only a few seconds or less as opposed to one or minutes using an older method such as ordered writes.

In one embodiment of the present technology, separated cache 200 is configured to provide an initial mapping of cache data 210 to storage device 112. This initial mapping is generated, in one embodiment, by map generator 224 and comprises identification information such as, for example, as metadata about cache data 210 or unique identifier information associated with a mapping of a particular instantiation of cache data 210. If included, metadata of cache data 210 may comprise, among other things, information about the amount of cache data 210 that will be transferred to storage device 112 and pointers, or other similar information, about the particular data of storage device 112 that elements of cache data 210 are associated with. Such metadata allows storage device 112 to establish a staging area of proper size to receive cache data 210, or if that is not possible, to send a response to transferor 220 which indicates that cache data 210 should be sent in smaller parcels rather than being streamed in its entirety. In one embodiment the identification information also comprises a unique identifier which associates the initial mapping (or any other mapping) with a particular instantiation of cache data 210. Such a unique identifier can comprise information such as a sequence number, a cyclic redundancy check (CRC) type data validation number associated with an instantiation of cache data 210, or some other such identifier. In one embodiment the pointers, if included, provide information which facilitates post-commit updates of associated data on storage device 112. In one embodiment, map generator 224 generates this initial mapping and it is sent by transferor 220 to storage device 112 prior to any of cache data 210 being transferred.

In one embodiment of the present technology, separated cache 200 is also configured to provide an updated mapping of cache data 210 in response to a change being made to cache data 210 subsequent to providing the initial mapping. Map generator 224 generates this follow up mapping. The updated mapping may be sent at any time, but in one embodiment is sent to storage device 112 after all of cache data 210 has been transferred. This updated mapping is typically sent to provide new identification information in the event that any of cache data 210 is changed after the creation of the initial mapping and before the finishing of the transfer of cache data 210 to storage device 112. Identifier information, such as a CRC or other identifier information, allows transferor 220 and storage device 112 to confirm or validate that the most up-to-date version of cache data 210 has been transferred to the staging area of storage device 112.

Figure 4:
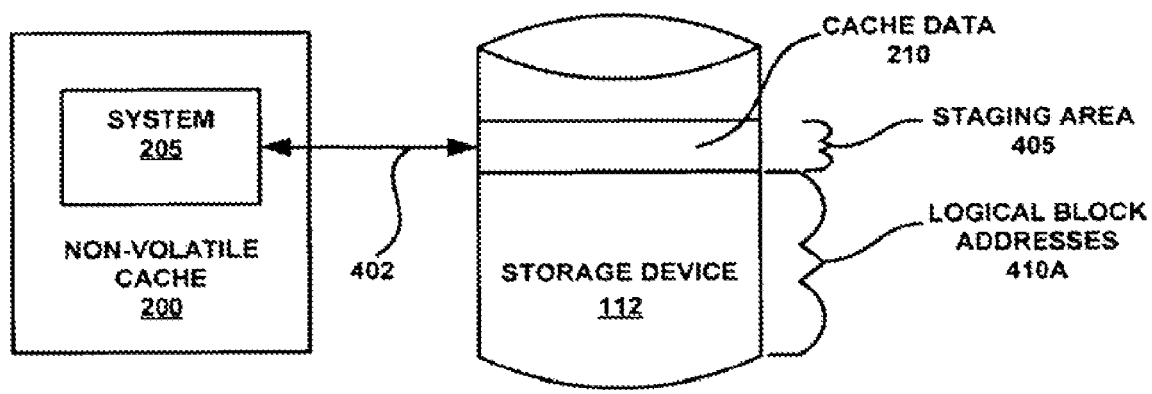
FIG. 4 is a visual representation of a cache data transfer in accordance with one embodiment of the present technology for efficiently synchronizing with a separated disk cache.

FIG. 4 is a visual representation of a cache data transfer in accordance with one embodiment of the present technology for efficiently synchronizing with a separated disk cache. FIG. 4 shows a top level view of separated cache 200 (which includes system 205). Separated cache 200 and system 205 are coupled to storage device 112 via communications line 402. As described above, storage device 112 has created a staging area 405 in response to a mapping of cache data 210 which is provided by map generator 224 via transferor 220. As shown in FIG. 4, staging area 405 resides outside of the logical block addressing area 410A that is presently mapped in storage device 112. In response to a flush command received by or a flush operation self-initiated by flush commander 222 (FIG. 2), cache data 210 from separated cache 200 has been sequentially written into staging area 405 through the use of transferor 220 (FIG. 2) of system 205. Storage device 112 then uses identifier information contained in the initial mapping, or in one embodiment an updated mapping, to verify to transferor 220 that that cache data 210 has been properly transferred into staging area 405.

At 320 of flow diagram 300, in one embodiment, an atomic commit operation is utilized to instruct storage device 112 to atomically commit cache data 210 to a mapping scheme of storage device 210. In one embodiment, cache data committer 230 communicates an atomic commit instruction to storage device 112, after confirmation that the correct cache data 210 has been transferred to the staging area of storage device 112. This is the first part of an atomic commit operation in which storage device 112 begins remapping cache data 210 from the staging area to an area that is properly addressed by the logical block addressing scheme of storage device 112. Thus, in an embodiment where the staging area is outside of the logical block addresses of storage device 112, the portion of the staging area that contains the newly transferred cache data 210 is remapped to be part of the LBA mapping of storage device 112. In many cases, such a remapping comprises adding or redirecting pointers or other mapping information to identify cache data 210 in the staging area without requiring movement of any cache data 210 from the staging area to other locations of storage device 112. The commit operation is called atomic because it is a pass/fail operation. Thus, if all of the transferred cache data 210 is not successfully remapped to the mapping scheme of storage device 210 during this commit operation, the commit operation is considered to have failed.

At 330 of flow diagram 300, in one embodiment a response to the atomic commit operation is received from the storage device. In one embodiment this response is a simple positive or negative response which is provided from storage device 112 to cache data committer 230 to indicate whether or not the atomic commit operation was successful (positive) or not successful (negative). In some embodiments, additional information may also be provided, such as specific information about a particular piece of cache data 210 which storage device 112 was unable to successfully commit.

Figure 5:
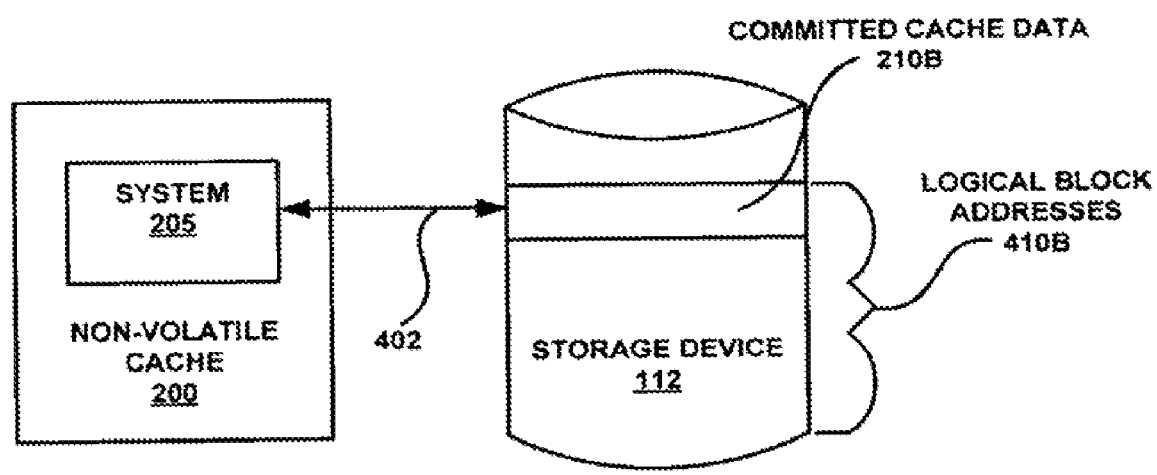
FIG. 5 is a visual representation of an exemplary atomic commit operation in accordance with one embodiment of the present technology for efficiently synchronizing with a separated disk cache.

FIG. 5 is a visual representation of an exemplary atomic commit operation in accordance with one embodiment of the present technology for efficiently synchronizing with a separated disk cache. In FIG. 5, as in FIG. 4, a top level view of separated cache 200 (incorporating system 205) is shown coupled to storage device 112 by communications line 402. In FIG. 5, an atomic commit operation has been performed in response to a commit instruction provided by cache data committer 230 (FIG. 2) of system 205. Storage device 112 has successfully remapped staging area 405 (FIG. 4) into the logical block addresses of storage device 112. As shown in FIG. 5, the committed cache data 210B is now mapped in to the expanded logical block addresses 410B of storage device 112. In response to successfully performing this remapping, storage device 112 communicates the positive results of the atomic commit operation to system 205.

At 340 of flow diagram 300, in one embodiment, erasure of the cache data 210 from separated cache 200 is conditioned on the receipt of a positive response to the commit operation. In one embodiment, following receipt of a positive response to the commit operation by cache data committer 230, erasure command issuer 232 issues a command to separated cache 200 to erase the contents of cache data 210 that have been successfully transferred to and committed to storage device 112. This erasure command can comprise a request for erasure, an erasure instruction, or in some embodiments, may actually carry out the erasure of the appropriate cache data 210.

Following a successful atomic commit operation, a variety of post-commit actions may be performed with the cache data which as been committed to storage device 112. For example a de-fragmentation type optimization may be performed by relocating elements of the committed data to the physical areas of the storage device that the elements of data are related to. This provides for further optimization so that data reads and writes are not required perform as many seeks around storage device 112 when reading or writing to data that has been updated by the committed cache data. Such a de-fragmentation type operation may be performed autonomously by storage device 112 or in conjunction with some instruction or direction from system 205. For example, in one embodiment, information from the most recent mapping of cache data that was provided with the committed cache data is utilized by storage device 112 to guide the de-fragmentation type relocation of the committed cache data to proper locations on storage device 112.

Synchronizing a Storage Device with a Separated Cache

FIG. 6 is a flow diagram 600 of operations performed in accordance with one embodiment of the present technology for efficiently synchronizing with a separated disk cache. More specifically, FIG. 6 illustrates a flow diagram 600 of an exemplary embodiment of a method for synchronizing a storage device with a separated cache. Elements of flow diagram 600 are described below in conjunction with reference to portions of system 205 of FIG. 2, flow diagram 300 of FIG. 3, and elements of FIG. 4 and FIG. 5.

At step 610 of flow diagram 600, in one embodiment, the configuration of a staging area within a storage device is ensured. The staging area is a set of one or more logical blocks used for receiving cache data that is transferred from the separated cache to the storage device, for example, as part of a cache flushing operation. As previously described, in one embodiment map generator 224 (FIG. 2) provides an initial mapping of cache data 210 via transferor 220 to storage device 112. The initial mapping is utilized by storage device 112 to ascertain a required size of the staging area. Storage device 112 uses information, such as metadata, in this initial mapping to configure a staging area within storage device 112 that is properly sized to receive the amount of cache data 210 which will be written into it. In one embodiment, for example, the staging area is configured within the LBA mapped region of storage device 112, for example, as a scratch pad of one or more logical blocks used for receiving and sequentially recording transferred cache data 210.

In another embodiment, as shown in FIG. 4 the configured staging area instead comprises a sequentially writable staging area 405 of logical blocks defined outside of existing logical block addresses 410 of storage device 112. For example, in one embodiment, staging area 405 is configured in an unmapped or "hidden" region of storage device 112 which is set aside specifically for receiving transfers of cache data 210 from separated cache 200. In one embodiment, after configuring the staging area, storage device 112 communicates information describing the staging area to transferor 220 of system 205. Such communicated information about the staging area can comprise, for example, information about the size of the staging area, information about the location of the staging area, and information which indicates success or failure in setting up the staging area.

At 620 of flow diagram 600, in one embodiment, transfer of cache data from the separated cache to the staging area is directed. Transferor 220 directs transfer of cache data 210 to the configured staging area in storage device 112. In one embodiment, this transfer of data takes place as part of a flush operation that begins after flush commander 222 receives a flush command or self-initiates a flush operation. Cache data 210 is written sequentially or substantially sequentially to the staging area as it is received by storage device 112. This sequential writing eliminates nearly all of the often random seeks that take place in many other slower methods of transferring cache data from a separated cache to a storage device. This is not to say that there are no seeks, because in some embodiments, normal operations of storage device 112 may cause temporary interruptions of the writing of the transferred cache data 210. Thus, some random seeking may be required due to such interruptions. It is appreciated that if writing of transferred cache data 210 to the staging area is interrupted by an anomaly, such as a power failure for example, that writing of the transferred cache data 210 simply resumes where it left off, or else restarts again with a re-initiation of the transfer process by transferor 220. FIG. 4 shows an example of cache data 210 which has been transferred from separated cache 200 to staging area 405 of storage device 112.

In one embodiment, prior to directing the transfer of cache data 210, transferor 220 directs the transfer of an initial mapping (previously described) of cache data 210 that is generated by map generator 224. Furthermore, in one such embodiment, transferor 220 also directs the transfer of an updated mapping of cache data 210 to storage device 112 in response to changes being made to cache data 210 after the initiation of the transfer. Such changes to cache data 210 are possible in instances where cache 200 remains in operation while the transfer of cache data 210 is taking place. The updated mapping provides identifier information (previously described) which allows transferor 220 and storage device 112 to ensure that the transferred cache data 210 is correct prior the transferred cache data being committed to storage device 112. The initial mapping and updated mapping may be stored in the staging area or in some other area of storage device 112.

At 630 of flow diagram 600, in one embodiment, an atomic commit operation is initiated to incorporate the transferred cache data into a mapping scheme of the storage device. Elements of such an atomic commit operation are consistent with those previously described in conjunction with 320 of flow diagram 300 (FIG. 3). Thus, in one such embodiment, cache data committer 230 initiates the atomic commit operation in response to receiving a communication, such as a matching CRC, from storage device 112 that cache data 210 has been properly transferred. Cache data committer 230 initiates the atomic commit operation by sending a commit instruction or request to storage device 112. Storage device 112 responds by incorporating cache data 210 from the staging area into the mapping (such as the LBA mapping scheme) of storage device 112.

FIG. 5 shows an example of cached data (committed cache data 210B) which has been remapped from a storage area 405 (FIG. 4) outside of the logical block addressing 410A (FIG. 4) of storage device 112, into the revised logical block addressing 410B of storage device 112. In one embodiment, such a remapping may be carried out by setting appropriate LBA pointers to point to the elements of committed cache data 210B. Following completion (or an attempt at completion) of the remapping, storage device 112 communicates the success or failure of the atomic commit operation to cache data committer 230 of system 205.

At 640 of flow diagram 600, in one embodiment, erasure of cache data 210 from separated cache 200 is conditioned on a successful outcome of the atomic commit operation. Thus, when cache data 210 is successfully transferred and committed to storage device 112 it may then be safely erased from separated cache 200 without concern over consistency issues or data loss which could occur if cache data 210 is not successfully transferred to or committed to storage device 112.

As previously described, in one embodiment, following receipt of a positive response to the commit operation by cache data committer 230, erasure command issuer 232 issues a command to separated cache 200 to erase the contents of cache data 210 that have been successfully transferred to and committed to storage device 112. This erasure command can comprise a request for erasure, an erasure instruction, or in some embodiments, may actually carry out the erasure of the appropriate cache data 210.

Additionally, as previously described, after a successful atomic commit operation, a variety of post-commit actions may be performed with the cache data which as been committed to storage device 112. For example a de-fragmentation type optimization may be performed by relocating elements of the committed data to the physical areas of the storage device that the elements of data are related to. This provides for further optimization so that data reads and writes are not required perform as many seeks around storage device 112 when reading or writing to data that has been updated by the committed cache data. Such a de-fragmentation type operation may be performed autonomously by storage device 112 or in conjunction with some instruction or direction from system 205. For example, in one embodiment, information from the most recent mapping of cache data that was provided with the committed cache data is utilized by storage device 112 to guide the de-fragmentation type relocation of the committed cache data to proper locations on storage device 112.

Exemplary embodiments and advantages of the present technology for efficiently synchronizing with a separated disk separated cache are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for maintaining a storage device state with a separated cache, said method comprising:
   configuring said separated cache to transfer cache data to a staging area of said storage device; and
   utilizing an atomic commit operation to instruct said storage device to atomically commit said cache data to a mapping scheme of said storage device, wherein after a successful atomic commit operation, a post-commit action is performed with the cache data which has been committed to said storage device, wherein the post-commit action comprises said storage device utilizing information from a most recent mapping of cache data that was provided with the committed cache data to guide a de-fragmentation type relocation of the committed cache data to proper locations on said storage device.

2. The method of claim 1, wherein prior to the atomic commit operation, the staging area is located outside of an existing logical block addresses of the storage device.

3. The method of claim 1, wherein the staging area is created as sequentially writable logical blocks set aside within a logical block addressing mapped by the storage device.

4. The method of claim 1, wherein the staging area allows for writing of cache data sequentially into one or more contiguous sequentially writable areas.

5. The method of claim 1, wherein the separated cache initiates a flush command at regular periodic intervals.

6. The method of claim 1, wherein the separated cache initiates a flush command in response to storage of a predetermined amount of cache data.

7. The method of claim 1, wherein flushing of the cache data is self-initiated by a flush commander.

8. The method of claim 7, wherein flushing of the cache data is performed without receipt of a cache flushing command.

9. A computer-readable medium having computer-executable instructions for performing a method for synchronizing a storage device with a separated cache, the method comprising:
   ensuring configuration of a staging area within said storage device, said staging area for receiving cache data transferred from said separated cache to said storage device;
   directing transfer of said cache data from said separated cache to said staging area; and
   initiating an atomic commit operation to incorporate said cache data into a mapping scheme of said storage device, wherein after a successful atomic commit operation, a post-commit action is performed with said cache data which has been committed to said storage device, wherein the post-commit action comprises said storage device utilizing information from a most recent mapping of cache data that was provided with the committed cache data to guide a de-fragmentation type relocation of the committed cache data to proper locations on said storage device.

10. The computer-readable medium of claim 9, wherein prior to the atomic commit operation, the staging area is located outside of an existing logical block addresses of the storage device.

11. The computer-readable medium of claim 9, wherein the staging area is created as sequentially writable logical blocks set aside within a logical block addressing mapped by the storage device.

12. The computer-readable medium of claim 9, wherein the staging area allows for writing of cache data sequentially into one or more contiguous sequentially writable areas.

13. A system for synchronizing a storage device state with a separated cache, said system comprising:
   a transferor configured to transfer cache data from said separated cache to a staging area of said storage device; and
   a cache data committer configured to ensure commitment of said cache data following said transfer of said cache data, wherein commitment of said cache data is confirmed by a positive result of an atomic commit operation performed by said storage device, wherein after a successful atomic commit operation, a post-commit action is performed with said cache data which has been committed to said storage device, wherein the post-commit action comprises said storage device utilizing information from a most recent mapping of cache data that was provided with the committed cache data to guide a de-fragmentation type relocation of the committed cache data to proper locations on said storage device.

14. The system of claim 13, wherein said separated cache initiates a flush command at regular periodic intervals.

15. The system of claim 13, wherein said separated cache initiates a flush command in response to storage of a predetermined amount of cache data.

16. The system of claim 13, wherein flushing of the cache data is self-initiated by a flush commander.

17. The system of claim 16, wherein flushing of the cache data is performed without receipt of a cache flushing command.

* * * * *